United States Patent
Chae et al.

(10) Patent No.: US 11,763,494 B2
(45) Date of Patent: Sep. 19, 2023

(54) MOBILE SURVEILLANCE APPARATUS AND OPERATION METHOD THEREOF

(71) Applicant: HANWHA AEROSPACE CO., LTD., Changwon-si (KR)

(72) Inventors: Hee Seo Chae, Changwon-si (KR); Jae Chan Park, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 0 days.

(21) Appl. No.: 16/994,783

(22) Filed: Aug. 17, 2020

(65) Prior Publication Data
US 2021/0233285 A1 Jul. 29, 2021

(30) Foreign Application Priority Data
Jan. 29, 2020 (KR) .................. 10-2020-0010488

(51) Int. Cl.
*G06T 11/00* (2006.01)
(52) U.S. Cl.
CPC ................... *G06T 11/00* (2013.01)
(58) Field of Classification Search
CPC .... G06T 11/00; G05D 1/0274; G05D 1/0242; G05D 1/024; H04N 7/185
See application file for complete search history.

(56) References Cited

U.S. PATENT DOCUMENTS

| | | | |
|---|---|---|---|
| 11,199,853 B1* | 12/2021 | Afrouzi | G05D 1/0274 |
| 2012/0158178 A1* | 6/2012 | Hyung | G05D 1/0274 |
| | | | 901/46 |
| 2016/0188977 A1* | 6/2016 | Kearns | G05D 1/0274 |
| | | | 348/113 |
| 2019/0021568 A1* | 1/2019 | Kim | A47L 9/2894 |
| 2019/0286145 A1* | 9/2019 | LaFary | G05D 1/0255 |
| 2020/0086491 A1* | 3/2020 | Shin | H04N 7/142 |
| 2020/0089252 A1* | 3/2020 | Kim | B25J 9/1697 |

FOREIGN PATENT DOCUMENTS

| | | |
|---|---|---|
| KR | 10-1689081 B1 | 12/2016 |
| KR | 10-2018-0105984 A | 10/2018 |
| KR | 10-1903244 B1 | 10/2018 |
| KR | 10-2007249 B1 | 8/2019 |

* cited by examiner

*Primary Examiner* — Syed Haider
(74) *Attorney, Agent, or Firm* — Sughrue Mion, PLLC

(57) ABSTRACT

A mobile surveillance apparatus includes: a communication interface configured to receive map data of a preset area; and a processor configured to process the map data by reflecting at least one of unevenness and obstruction on a driving surface of a mobile module, and set a path for the mobile module, based on the processed map data.

13 Claims, 7 Drawing Sheets

MOBILE SURVEILLANCE APPARATUS AND OPERATION METHOD THEREOF

CROSS-REFERENCE TO THE RELATED APPLICATION

This application is based on and claims priority from Korean Patent Application No. 10-2020-0010488, filed on Jan. 29, 2020, in the Korean Intellectual Property Office, the disclosure of which is incorporated herein in its entirety by reference.

BACKGROUND

1. Field

One or more embodiments of the inventive concept relate to a mobile surveillance apparatus providing a stable surveillance image, and an operation method of the mobile surveillance apparatus.

2. Description of Related Art

Indoor areas or maintained outdoor areas may be monitored in real time by using fixed cameras.

However, it is virtually impossible to continuously monitor ambiguous outdoor areas using fixed cameras. Surveillance methods using mobile robots with cameras installed thereon have been used to monitor wider areas.

While performing autonomous driving, mobile robots may provide surveillance images in real time to enable remote shooting.

Unevenness and/or obstructions may exist on the ground or in the air where the mobile robots drive, and shaking occurring while driving on the unevenness and/or the obstructions may affect the surveillance images.

Therefore, there is a need to provide surveillance images with minimal impact from shaking that occurs during driving.

SUMMARY

One or more embodiments of the inventive concept provide a mobile surveillance apparatus generating a stable surveillance image and an operation method thereof.

Various aspects of the embodiments will be set forth in part in the description which follows and, in part, will be apparent from the description, or may be learned by practice of the presented embodiments.

According to one or more embodiments, there is provided a mobile surveillance apparatus which may include: a communication interface configured to receive map data of a preset area; and a processor configured to process the map data by reflecting at least one of unevenness and obstruction on a driving surface of a mobile module, and set a path for the mobile module, based on the processed map data.

The processor may generate a plurality of paths, and select the path having the least unevenness or the least unevenness change on the driving surface from the plurality of paths based on the processed map data.

The mobile surveillance apparatus may further include: the mobile module configured to perform driving along the path; and a sensor configured to sense at least one of the unevenness and the obstruction on the driving surface.

The sensor may sense an object that is moving, and the processor may predict a moving path of the object base on a moving direction of the object, generate a plurality of object tracking paths according to the moving path; and selects an object tracking path having the least unevenness or the least unevenness change on the driving surface from the plurality of object tracking paths based on the processed map data.

The processed map data may form a three-dimensional map.

According to one or more embodiments, there is provided a mobile surveillance apparatus which may include: a communication interface configured to receive information about a path of a mobile module, the information comprising unevenness on a driving surface of the path; and a processor configured to perform image processing on an image captured by a photographing module installed on the mobile module, according to a driving direction of the mobile module, wherein the driving direction comprises at least one of an upward direction, a downward direction, a clockwise direction, and a counterclockwise direction according to the unevenness on the driving surface of the path.

The processor may perform the image processing such that: at least a part of an upper part of the captured image is cut based on the driving direction being the upward direction; and at least a part of a lower part of the captured image is cut based on the driving direction being the downward direction.

The processor may perform the image processing such that: at least a part of a right side of the captured image is cut based on the driving direction is the clockwise direction; and at least a part of a left side of the captured image is cut based on the driving direction being the counterclockwise direction.

According to one or more embodiments, there is provided a mobile surveillance apparatus which may include: a communication interface configured to receive information about a path of a mobile module, the information comprising unevenness on a driving surface of the path; and configured to set an image capturing direction of a photographing module installed on a mobile module to a direction opposite to a driving direction of the mobile module, wherein the driving direction comprises at least one of an upward direction, a downward direction, a clockwise direction, and a counterclockwise direction according to the unevenness on the driving surface of the path.

The photographing module may perform the image capturing by panning, tilting and/or zooming in the direction opposite to the driving direction of the mobile module set by the processor.

According to one or more embodiments, there is provided a method of operating a mobile surveillance apparatus including a communication interface, a mobile module, a sensor, and a processor. The method may include: receiving, by the communication interface, map data about a preset area; performing, by the mobile module, driving in the preset area; sensing, by the sensor, at least one of unevenness and obstruction on a driving surface of the mobile module in the preset area; and processing, by the processor, the map data about the preset area by reflecting at least one of unevenness and obstruction on the driving surface of the mobile module, and setting a path for the mobile module, based on the processed map data.

The method may further include: generating, by the processor, a plurality of paths; and selecting, by the processor, the path having the least unevenness or the least unevenness change on the driving surface from the plurality of paths based on the processed map data.

The driving surface may include at least one of a ground surface and an imaginary plane in the air, and the unevenness may include at least one of unevenness on the ground surface and unevenness formed by objects protruding from an imaginary plane in the air.

The method may further include: sensing an object that is moving by the sensor; predicting, by the processor, a moving path of the object based on a moving direction of the object; generating, by the processor, a plurality of object tracking paths according to the moving path; and selecting, by the processor, an object tracking path with the least unevenness or the least unevenness change on the driving surface from the plurality of object tracking paths based on the processed map data.

According to one or more embodiments, there is provided a method of operating a mobile surveillance apparatus including a communication interface, a mobile module, a sensor, and a processor. The method may include: receiving, by the communication interface, information about a path of the mobile module in a preset area, the information comprising unevenness on a driving surface of the path; performing driving, by the mobile module, along the path, and performing image capturing by a photographing module installed on the mobile module; and performing image processing, by the processor, on an image captured by the photographing module, according to a driving direction of the mobile module, wherein the driving direction comprises at least one of an upward direction, a downward direction, a clockwise direction, and a counterclockwise direction according to the unevenness on the driving surface of the path.

The performing the image processing may include performing image processing such that: at least a part of an upper part of the captured image is cut based on the driving direction being the upward direction; and at least a part of a lower part of the captured image is cut based on the driving direction being the downward direction.

The performing the image processing may include performing image processing such that: at least a part of a right side of the captured image is cut based on the driving direction being the clockwise direction; and at least a part of a left side of the captured is cut based on the driving direction being the counterclockwise direction.

According to one or more embodiments, there is provided a method of operating a mobile surveillance apparatus including a communication interface, a mobile module, a sensor, and a processor. The method may include: receiving, by the communication interface, information about a path of the mobile module in a preset area, the information comprising unevenness on a driving surface of the path; performing driving along the path by the mobile module, and performing image capturing by a photographing module installed on the mobile module; and setting, by the processor, an image capturing direction of the photographing module to a direction opposite to a driving direction of the mobile module, wherein the driving direction comprises at least one of an upward direction, a downward direction, a clockwise direction, and a counterclockwise direction according to the unevenness on the driving surface of the path.

The image capturing may be performed by the photographing module by panning, tilting and/or zooming in the capturing direction set by the processor.

BRIEF DESCRIPTION OF THE DRAWINGS

The above and other aspects, features, and advantages of the embodiments of the inventive concept will be more apparent from the following description taken in conjunction with the accompanying drawings, in which.

DETAILED DESCRIPTION

Figure 1:
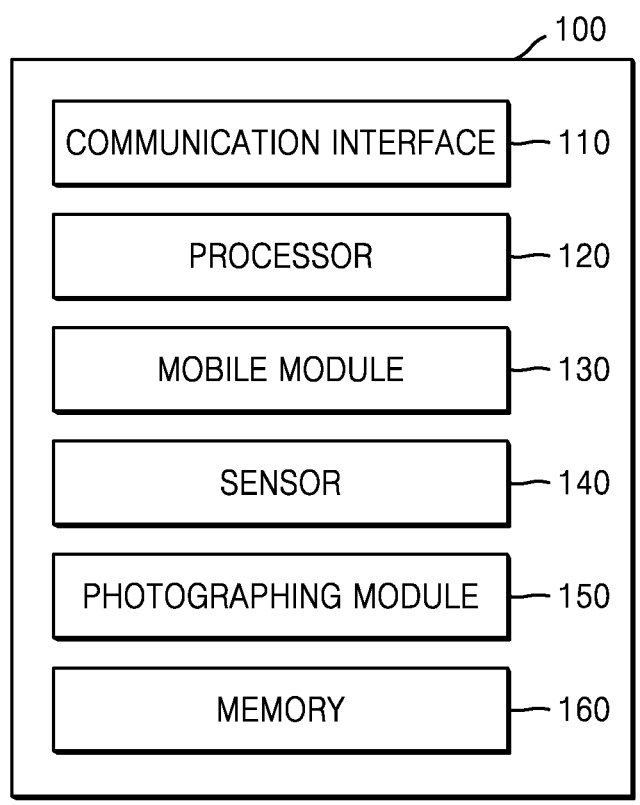
FIG. 1 is a block diagram illustrating a structure of a mobile surveillance apparatus according to an embodiment.

Reference will now be made in detail to embodiments, examples of which are illustrated in the accompanying drawings, wherein like reference numerals refer to like elements throughout. In this regard, the present embodiments are all example embodiment, and thus, may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While the embodiments are capable of various modifications and alternative forms, there is no intent to limit these embodiments to the particular forms disclosed, but on the contrary, these embodiments are to cover all modifications, equivalents, and alternatives falling within the scope of the inventive concept. The embodiments described herein may also be combined to one embodiment to achieve the inventive concept. In the descriptions herein, if it is determined that the detailed descriptions of the related known technology may obscure the subject matter of the disclosure, the detailed description thereof will be omitted.

It will be understood that, although the term "first," "second" etc. may be used herein to describe various elements, these elements should not be limited by these terms. These terms are only used to distinguish one element from another.

The terminology used herein is for the purpose of describing particular embodiments only and is not intended to be limiting of the inventive concept. The singular forms are intended to include the plural forms as well, unless the context clearly indicates otherwise. It will be understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The embodiments may be represented by functional block structures and various processing steps or operations. These functional blocks shown in FIG. 1 to be described herein may be implemented in the various numbers of hardware and/or software structures that perform particular functions. For example, the embodiments may employ integrated circuit structures, such as memory, processing, logic, look-up tables, etc., which may execute various functions under control of one or more microprocessors or other control devices. Similar to elements of embodiments that may be implemented with software programming or software elements, the embodiments may be implemented in programming or scripting languages such as C, C++, Java, assembler, etc., including various algorithms implemented in combinations of data structures, processes, routines, or other programming structures. Functional aspects may be implemented in algorithms executed on one or more processors. Also, embodiments may employ the related art for electronic environment setting, signal processing, and/or data processing. The terms "mechanisms," "elements," "means," "components," etc. may be broadly used but is not limited to mechanical and physical structures. The terms may include the meaning of a series of routines of software in conjunction with processors and the like.

One or more embodiments will now be described in detail with reference to the accompanying drawings.

Hereinafter, duplicate descriptions will be omitted or simplified.

FIG. 1 is a block diagram illustrating a structure of a mobile surveillance apparatus according to an embodiment.

Referring to FIG. 1, a mobile surveillance apparatus 100 according to an embodiment includes a communication interface 110, a processor 120, a mobile module 130, a sensor 140, a photographing module 150, and a memory 160.

The communication interface 110 receives information from an external terminal or server, and transmit information to the external terminal or server. The communication interface 110 may include any one or any combination of a digital modem, a radio frequency (RF) modem, a WiFi chip, and related software and/or firmware, not being limited thereto.

The communication interface 110 may receive a two-dimensional map of a preset area or data related to the two-dimensional map. The preset area may be an indoor area and/or an outdoor area, but is not limited thereto. The two-dimensional map or the data related to the two-dimensional map may include information about topography, buildings, altitude, and the like, but is not limited thereto.

The communication interface 110 may receive information indicating a starting point and an arrival point of the mobile module 130 in the preset area. The information indicating the starting point and the arrival point in the preset area may be generated by an input of a user but is not limited thereto. This information may be received through a user interface such as keyboard, mouse, touch pad, scanner, not being limited thereto, which may be incorporated in the communication interface 110.

The information indicating the starting point and the arrival point in the preset area may be global positioning system (GPS) information or the like, but is not limited thereto, which may be received from the external terminal or server.

The communication interface 110 may further receive information indicating a path for the mobile module 130 in the preset area in addition to the starting point and the arrival point in the preset area.

The processor 120 may generate a three-dimensional map of the preset area. The processor 120 may control the mobile module 130 to drive in the preset area. The mobile module 130 may include one or more wheels, tracks, caterpillars and/or propellers, not being limited thereto, and a driving module driving the wheels, tracks, caterpillars and/or propellers. The processor 120 may generate the three-dimensional map of the preset area by reflecting, on the two-dimensional map, at least one of unevenness of and/or obstructions on a driving surface sensed by the sensor 140 according to driving of the mobile module 130.

The driving surface may be a surface of the ground, an imaginary plane in the air, or the like, but is not limited thereto. The unevenness may be unevenness on the ground surface or unevenness formed by mountains, buildings, or the like protruding from the imaginary plane in the air, but is not limited thereto.

The processor 120 may generate a plurality of paths for the mobile module 130 from the starting point to the arrival point. The processor 120 may generate a plurality of paths from the starting point to the arrival point based on the two-dimensional map and/or the three-dimensional map, but is not limited thereto.

The processor 120 may select a path having the least unevenness from the plurality of paths for the mobile module 130 based on the three-dimensional map. The path having the least unevenness may be a path with the smallest number of unevenness, a path with the smallest size of unevenness, or the like, but is not limited thereto.

When the mobile module 130 drives along the path having the least unevenness selected by the processor 120, the photographing module 150 may be able to capture an image with less shaking, and thus, the mobile surveillance apparatus 100 may provide a user with a more stable mobile surveillance image.

The processor 120 may select a path having the least unevenness change from the plurality of paths for the mobile module 130 based on the three-dimensional map. The path having the least unevenness change may be a path along which the smallest change in height of continuously existing unevenness occurs, a path along which the smallest change in slope of continuously existing unevenness occurs, a path along which positions of continuously existing obstructions are uniform or consistent, or the like, but is not limited thereto.

An operation for image processing that will be described below is more simplified for an image captured by the photographing module 150 when the mobile module 130 drives along a path having the least unevenness change selected by the processor 120, and thus, the mobile surveillance apparatus 100 may more efficiently provide the user with a stable mobile surveillance image. The photographing module 150 may include a surveillance camera having an image sensor such as complementary metal oxide semiconductor (CMOS) sensor or charge coupled device (COD) sensor, not being limited thereto.

The processor 120 may predict a moving path of an object in the preset area based on a moving direction of the object, and may generate a plurality of tracking paths for the mobile module 130 according to the moving path.

The processor 120 may generate a path for continuously monitoring the object along the moving path of the object as a tracking path. The plurality of tracking paths may be a preset number of paths having the highest continuity of object surveillance, but is not limited thereto. The preset number of paths having the highest continuity of object surveillance may be the preset number of paths having the longest object sensing interval, the preset number of paths having the longest total object sensing interval, the preset number of paths having the smallest total number of no object sensing intervals, or the like but is not limited thereto.

The processor 120 may select a tracking path having the least unevenness from the plurality of tracking paths based on the three-dimensional map.

When the mobile module 130 drives along the tracking path having the least unevenness selected by the processor 120, the photographing module 150 may capture an object tracking image with less shaking, and thus, the mobile surveillance apparatus 100 may provide the user with a more continuous and stable object tracking image.

The processor 120 may select a tracking path with the least unevenness change from the plurality of tracking paths based on the three-dimensional map.

An operation for image processing that will be described below is more simplified for an object tracking image captured by the photographing module 150 when the mobile module 130 drives along the tracking path with the least unevenness change selected by the processor 120, and thus, the mobile surveillance apparatus 100 may more efficiently provide the user with a continuous and stable object tracking image.

The processor 120 may perform image processing according to a driving direction of the mobile module 130 on an image captured by the photographing module 150, based on the three-dimensional map.

The driving direction may include at least one of an upward direction, a downward direction, a clockwise direction, and a counterclockwise direction according to unevenness of a path along which the mobile module 130 drives.

When the driving direction is the upward direction, the processor 120 may perform image processing that cuts at least a part of an upper part of the captured image.

When the driving direction of the mobile module 130 matches an image capturing direction of the photographing module 150 within a preset range, and the driving direction of the mobile module 130 is the upward direction, a position in which the object is captured in the image captured by the photographing module 150 may be changed from a center to a lower part. In this case, the processor 120 may acquire an image in which the object is finally captured in the center, by performing the image processing that cuts at least a part of the upper part of the captured image.

When the driving direction of the mobile module 130 matches the image capturing direction of the photographing module 150 within the preset range, and the driving direction of the mobile module 130 is the downward direction, the position in which the object is captured in the image captured by the photographing module 150 may be changed from the center to the upper part. In this case, the processor 120 may acquire an image in which the object is finally captured in the center, by performing image processing that cuts at least a part of the lower part of the captured image.

When the driving direction of the mobile module 130 matches the image capturing direction of the photographing module 150 within the preset range, and the driving direction of the mobile module 130 is the clockwise direction, the position in which the object is captured in the image captured by the photographing module 150 may be changed from the center to a left side. In this case, the processor 120 may acquire an image in which the object is finally captured in the center by performing image processing that cuts at least a part of a right side of the captured image.

When the driving direction of the mobile module 130 matches the image capturing direction of the photographing module 150 within the preset range, and the driving direction of the mobile module 130 is the counterclockwise direction, the position in which the object is captured in the image captured by the photographing module 150 may be changed from the center to the right side. In this case, the processor 120 may acquire an image in which the object is finally captured in the center by performing image processing that cuts at least a part of the left side of the captured image.

According to one or more embodiments, the mobile surveillance apparatus 100 may provide a mobile surveillance image in which shaking caused by unevenness on a driving surface may be corrected while driving on the driving surface having the unevenness, and thus, may provide the user with a stable mobile surveillance image regardless of a path.

The processor 120 may set the image capturing direction of the photographing module 150 to a direction opposite to the driving direction of the mobile module 130 based on the three-dimensional map.

The driving direction may include at least one of the upward direction, the downward direction, the clockwise direction, and the counterclockwise direction according to the unevenness of the path along which the mobile module 130 drives.

When the driving direction of the mobile module 130 matches the image capturing direction of the photographing module 150 within the preset range, and the driving direction of the mobile module 130 is the upward direction, the processor 120 may control the image capturing direction of the photographing module 150 in the downward direction so that the object is captured in the center of the image captured by the photographing module 150.

When the driving direction of the mobile module 130 matches the image capturing direction of the photographing module 150 within the preset range, and the driving direction of the mobile module 130 is the downward direction, the processor 120 may control the image capturing direction of the photographing module 150 in the upward direction so that the object is captured in the center of the image captured by the photographing module 150.

When the driving direction of the mobile module 130 matches the image capturing direction of the photographing module 150 within the preset range, and the driving direction of the mobile module 130 is the clockwise direction, the processor 120 may control the image capturing direction of the photographing module 150 in the counterclockwise direction so that the object is captured in the center of the image captured by the photographing module 150.

When the driving direction of the mobile module 130 matches the image capturing direction of the photographing module 150 within the preset range, and the driving direction of the mobile module 130 is the counterclockwise direction, the processor 120 may control the image capturing direction of the photographing module 150 in the clockwise direction so that the object is captured in the center of the image captured by the photographing module 150.

According to one or more embodiments, the mobile surveillance apparatus 100 may provide a mobile surveillance image in which an object is captured in a center without an additional correction while driving on a driving surface having unevenness, and thus, may more efficiently provide the user with a stable mobile surveillance image regardless of a path.

The mobile module 130 performs driving in the preset area. The mobile module 130 may perform first driving in the preset area in a random direction and/or at a random speed.

The mobile module 130 may perform driving along a path from the starting point to the arrival point. The mobile module 130 may perform second driving in the preset area along a preset path.

The mobile module 130 may include one or more wheels, tracks, caterpillars and/or propellers, not being limited thereto, of a vehicle and a driving module driving the wheels, tracks, caterpillars and/or propellers. Here, the vehicle may include a ground vehicle or an air vehicle, not being limited thereto.

For example, the mobile module 130 may perform driving on the ground, and/or along a virtual plane in the air.

The sensor 140 senses at least one of the unevenness and the obstructions on the driving surface in the preset area. For this purpose, the sensor 140 may include a distance sensor such as an infrared sensor, a laser sensor, or the like, but is not limited thereto.

The senor 140 may also sense a moving object. For this purpose, the sensor 140 may further include a motion sensor such as an infrared sensor, a laser sensor, a temperature sensor, or the like, but is not limited thereto.

The photographing module 150 performs image capturing. The photographing module 150 may perform image capturing by panning, tilting and/or zooming in the direction opposite to the driving direction of the mobile module 130 set by the processor 120.

The memory 160 stores the two-dimensional map and/or the three-dimensional map of the preset area.

The mobile surveillance apparatus 100 according to one or more embodiments may be embodied as one physical apparatus or a plurality of physical apparatuses combined to constitute the mobile surveillance apparatus 100 according to one or more embodiments. For this, part of elements included in the mobile surveillance apparatus may be embodied or installed as one physical apparatus, and the other elements may be embodied or installed as another physical apparatus. Here, the one physical apparatus may be embodied as part of a mobile body, and the other physical apparatus may be embodied as part of a server and/or a terminal. For example, the processor 120 and/or the communication interface 110 may be embodied in a server or a terminal physically separate from the other elements of the mobile surveillance apparatus 100.

Figure 2:
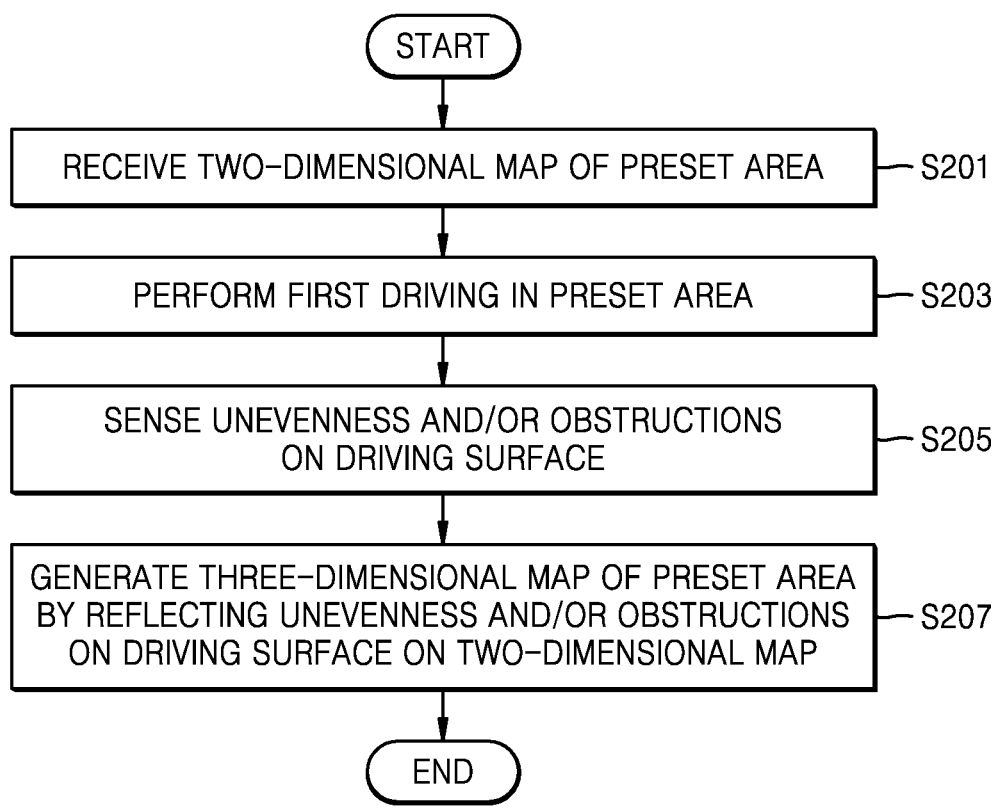
FIG. 2 is a flowchart illustrating a method of generating a three-dimensional map of a preset area, performed by a mobile surveillance apparatus, according to an embodiment.

FIG. 2 is a flowchart illustrating a method of generating a three-dimensional map of a preset area by a mobile surveillance apparatus, according to an embodiment.

Referring to FIGS. 1 and 2, in operation S201, the communication interface 110 receives a two-dimensional map of a preset area.

The mobile module 130 performs first driving in the preset area under control of the processor 120 in operation S203, and the sensor 140 senses unevenness and/or obstructions on a driving surface in the preset area, in operation S205.

In operation S207, the processor 120 generates a three-dimensional map of the preset area by reflecting the unevenness and/or the obstructions on the driving surface sensed by the sensor 140 on the two-dimensional map of the preset area.

According to the present embodiment, an image that may be continuously monitored without shaking may be provided for a user by generating and using a three-dimensional map on which unevenness and/or obstructions on a driving surface are reflected.

Figure 3A:
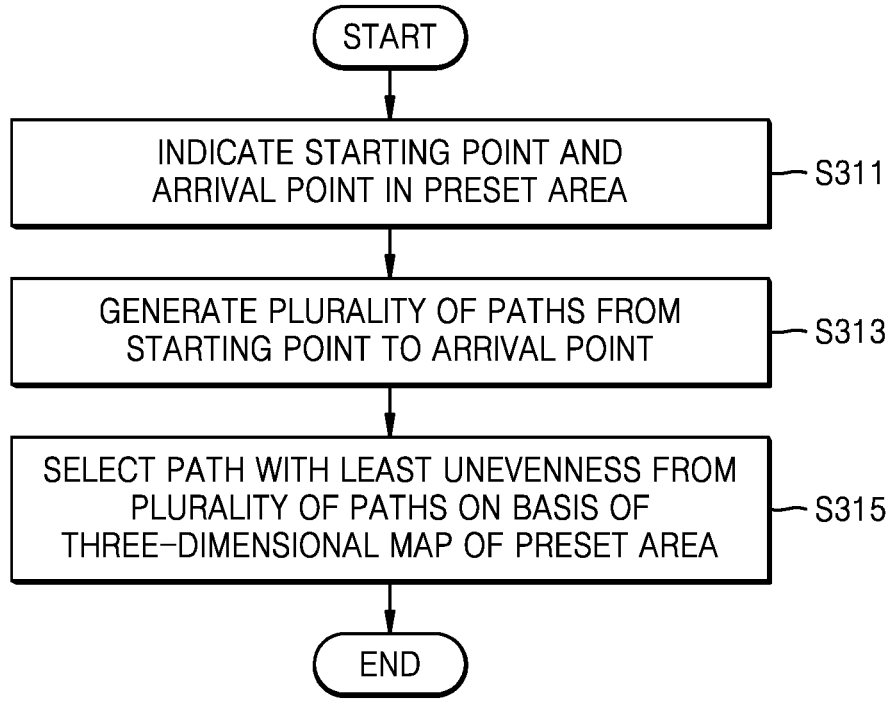
FIGS. 3A and 3B are flowcharts illustrating methods of selecting a path from a starting point to an arrival point, performed by a mobile surveillance apparatus, according to an embodiment.
Figure 3B:
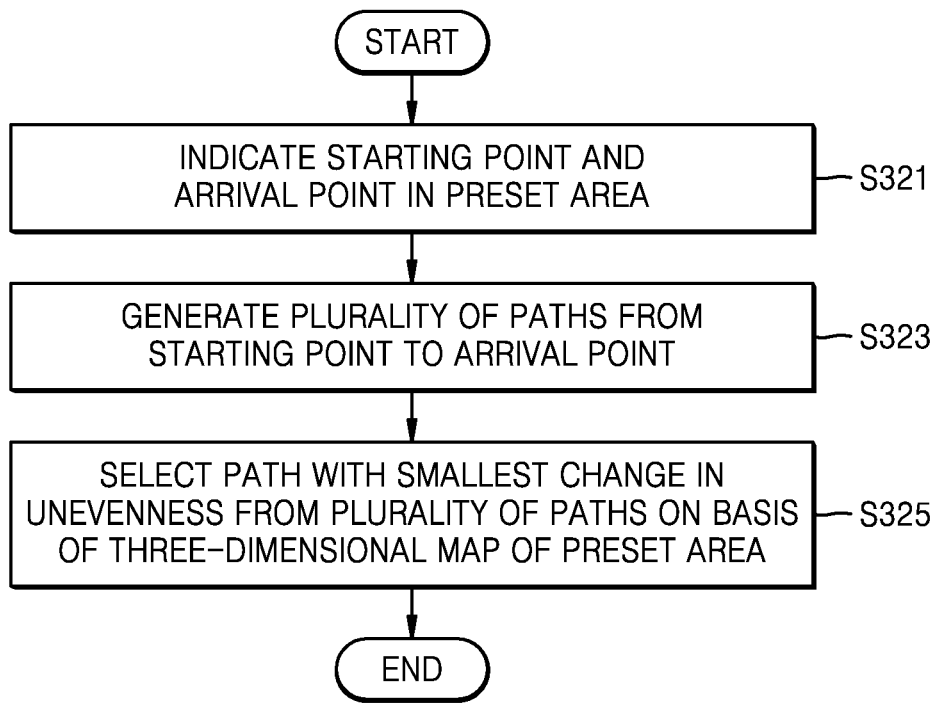

FIGS. 3A and 3B are flowcharts illustrating methods of selecting a path from a starting point to an arrival point by a mobile surveillance apparatus, according to an embodiment.

Referring to FIGS. 1 and 3A, in operation S311, the communication interface 110 receives information indicating a starting point and an arrival point of the mobile module 130 in a preset area.

In operation S313, the processor 120 generates a plurality of paths from the starting point to the arrival point for the mobile module 130.

In operation S315, the processor 120 selects a path having the least unevenness from the plurality of paths based on a three-dimensional map of the preset area.

When the mobile module 130 drives along the path having the least unevenness selected by the processor 120, the photographing module 150 may capture a mobile surveillance image with the least shaking.

Referring to FIGS. 1 and 3B, in operation S321, the communication interface 110 receives information indicating a starting point and an arrival point of the mobile module 130 in a preset area.

In operation S323, the processor 120 generates a plurality of paths from the starting point to the arrival point for the mobile module 130.

In operation S325, the processor 120 selects a path with the least unevenness change from the plurality of paths based on a three-dimensional map of the preset area.

When the mobile module 130 drives along the path with the least unevenness change selected by the processor 120, the processor 120 may correct shaking of an image captured by the photographing module 150 by performing the simplest operation.

Figure 4A:
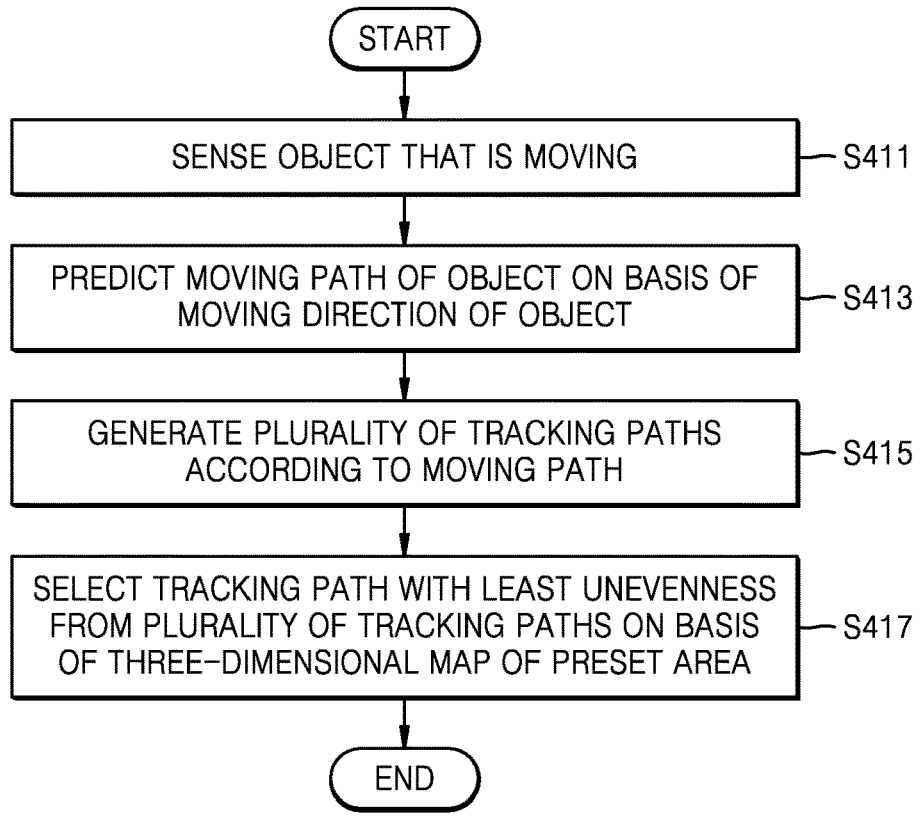
FIGS. 4A and 4B are flowcharts illustrating methods of selecting a tracking path of a moving object, performed by a mobile surveillance apparatus, according to an embodiment.
Figure 4B:
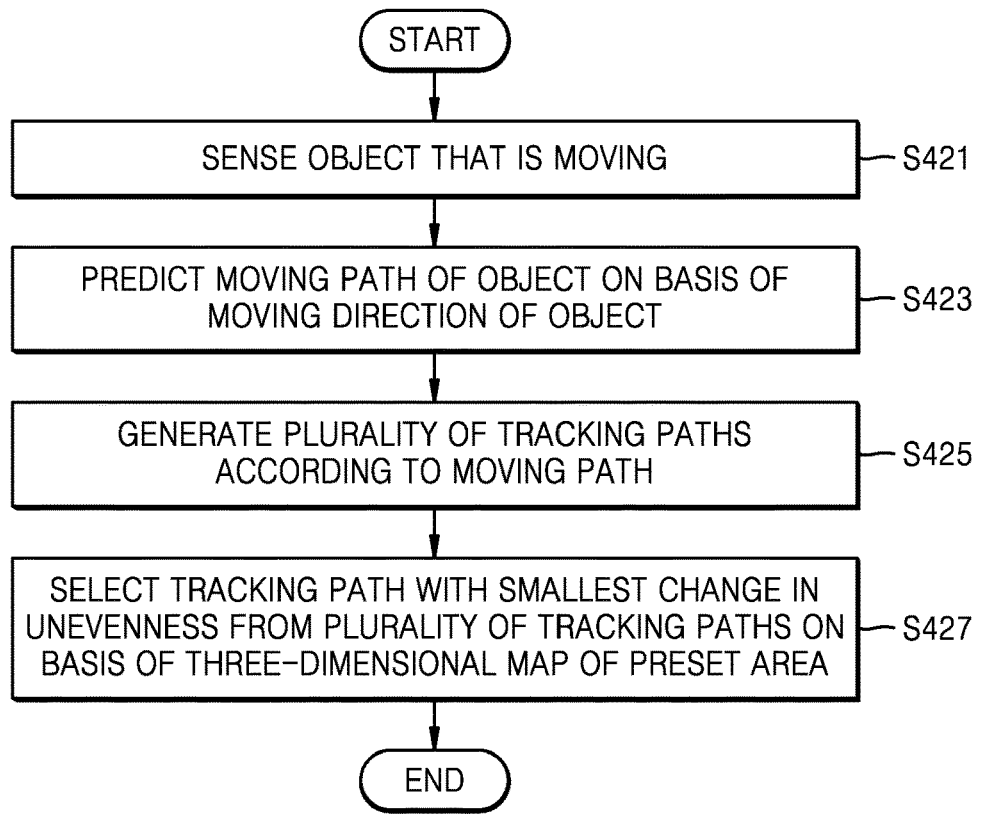

FIGS. 4A and 4B are flowcharts illustrating methods of selecting an object tracking path of a mobile surveillance apparatus, according to an embodiment.

Referring to FIGS. 1 and 4A, in operation S411, the sensor 140 senses an object moving in a preset area.

In operation S413, the processor 120 predicts a moving path of the object based on a moving direction of the object.

The processor 120 may predict the moving path of the object based on a current moving direction of the object.

The processor 120 may predict the moving path of the object based on a moving direction pattern of the object. The moving direction pattern of the object may be a pattern in which the moving direction of the object is changed for a preset period of time or the like, but is not limited thereto.

In operation S415, the processor 120 generates a plurality of tracking paths for the mobile module 130 according to the moving path. The plurality of tracking paths may be a preset number of paths with the highest continuity of object surveillance, but is not limited thereto.

In operation S417, the processor 120 selects the tracking path having the least unevenness from the plurality of tracking paths based on a three-dimensional map of the preset area.

When the mobile module 130 drives along the tracking path having the least unevenness selected by the processor 120, the photographing module 150 may capture an object tracking image with the least shaking.

Referring to FIGS. 1 and 4B, in operation S421, the sensor 140 senses an object moving in a preset area.

In operation S423, the processor 120 predicts a moving path of the object based on a moving direction of the object.

In operation S425, the processor 120 generates a plurality of tracking paths according to the moving path.

In operation S427, the processor 120 selects a tracking path having the least unevenness change from the plurality of tracking paths based on a three-dimensional map of the preset area.

When the mobile module 130 drives along the tracking path with the least unevenness change selected by the processor 120, the photographing module 150 may capture an object tracking image for which an operation for shaking correction is the simplest.

FIGS. 5, and 6A through 6D are flowcharts illustrating image processing methods of a mobile surveillance apparatus for acquiring a captured image with the least shaking, according to an embodiment.

Figure 5:
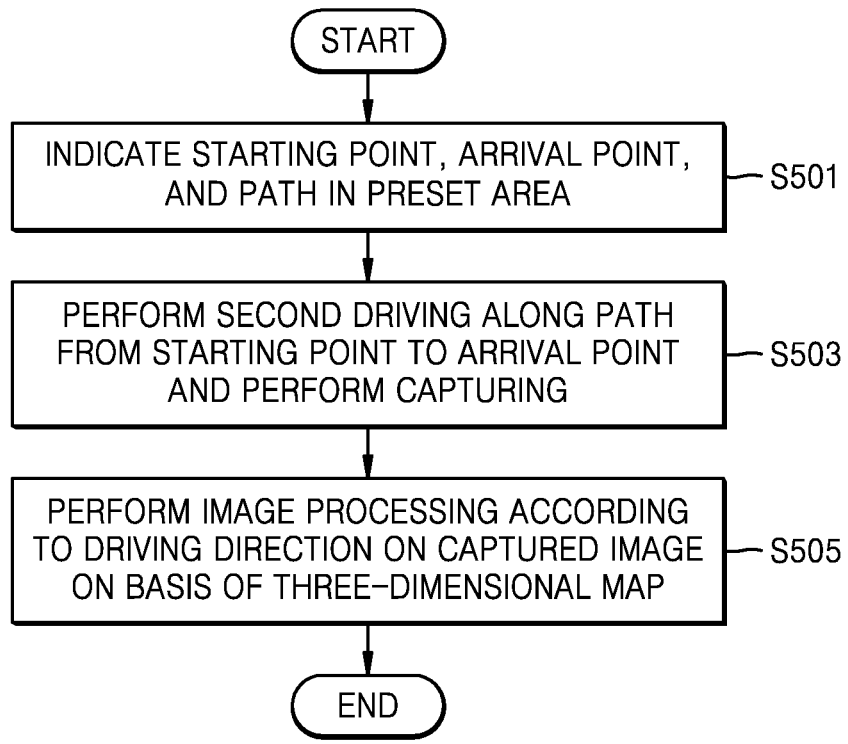
FIGS. 5 and 6A through 6D are flowcharts illustrating image processing methods of a mobile surveillance apparatus for acquiring a captured image with the least shaking, according to an embodiment.

Referring to FIG. 5, in operation S501, the communication interface 110 receives information indicating a starting point, an arrival point and a path of the mobile module 130 in a preset area.

In operation S503, the mobile module 130 performs second driving along the path from the starting point to the arrival point, and the photographing module 150 performs image capturing.

In operation S505, the processor 120 performs image processing according to a driving direction of the mobile module 130 on an image captured by the photographing module 150 based on a three-dimensional map of the preset area stored in the memory 160.

Here, the driving direction may include at least one of an upward direction, a downward direction, a clockwise direction, and a counterclockwise direction according to unevenness of the path along which the mobile module 130 performs driving.

Hereinafter, operation S505 will be described in detail with reference to FIGS. 6A through 6D.

Figure 6A:
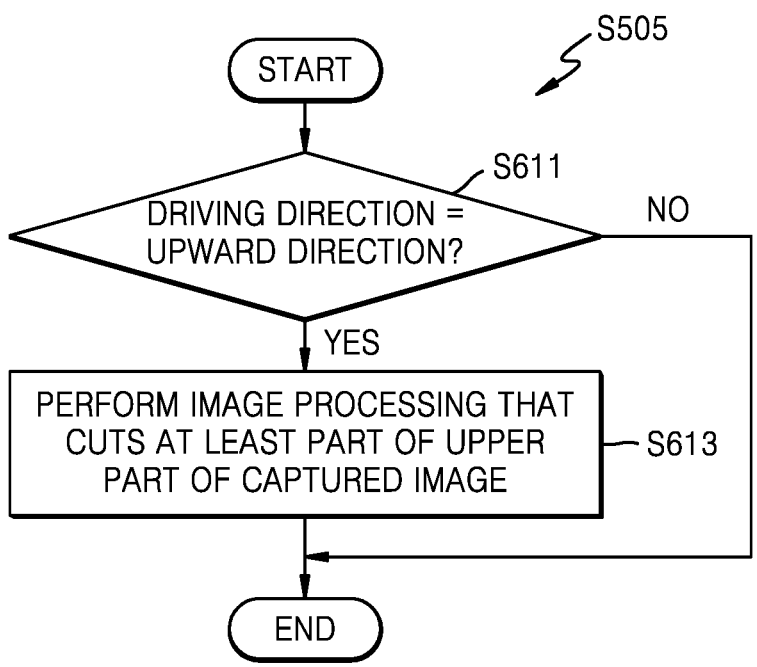

Referring to FIG. 6A, when the driving direction of the mobile module 130 is the upward direction in operation S611, the processor 120 performs image processing that cuts at least a part of an upper part of a captured image in operation S613.

Figure 6B:
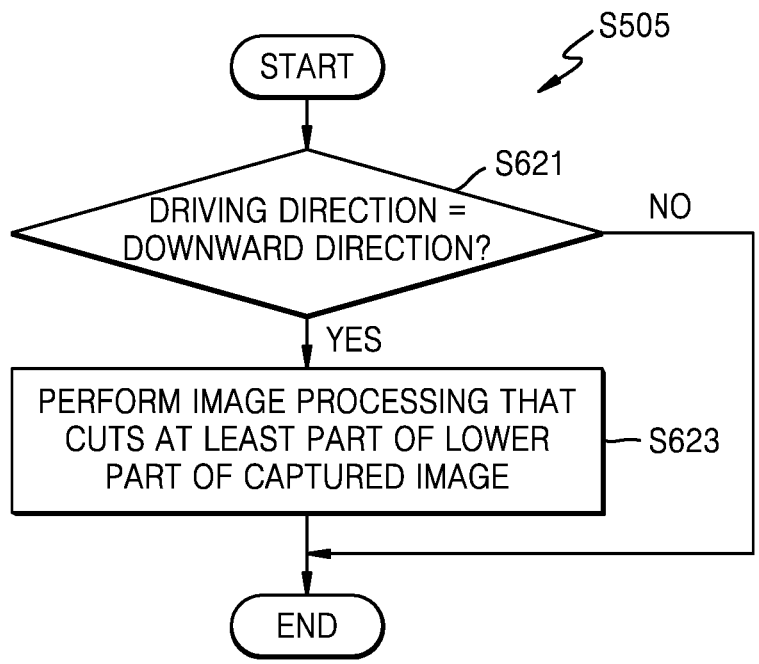

Referring to FIG. 6B, when the driving direction of the mobile module 130 is the downward direction in operation S621, the processor 120 performs image processing that cuts at least a part of a lower part of the captured image in operation S623.

Figure 6C:
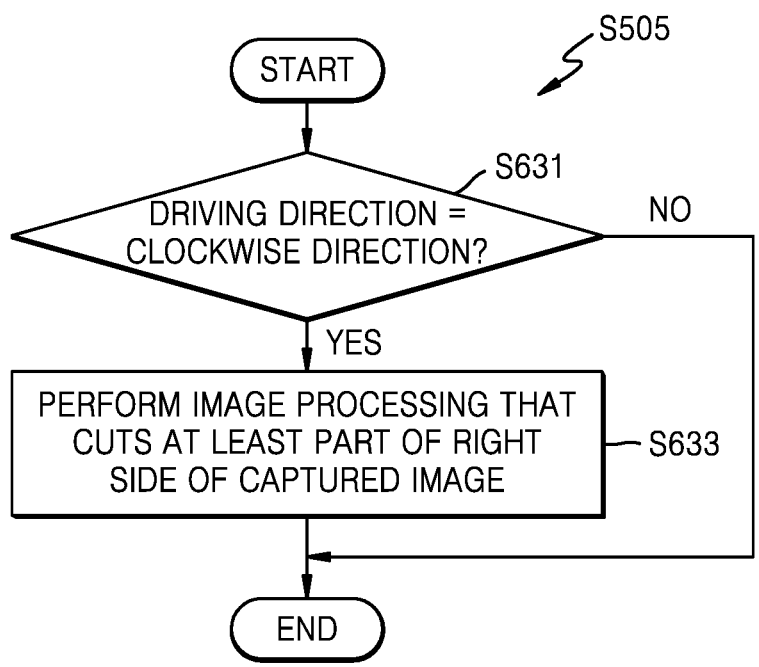

Referring to FIG. 6C, when the driving direction of the mobile module 130 is the clockwise direction in operation S631, the processor 120 performs image processing that cuts at least a part of a right side of the captured image in operation S633.

Figure 6D:
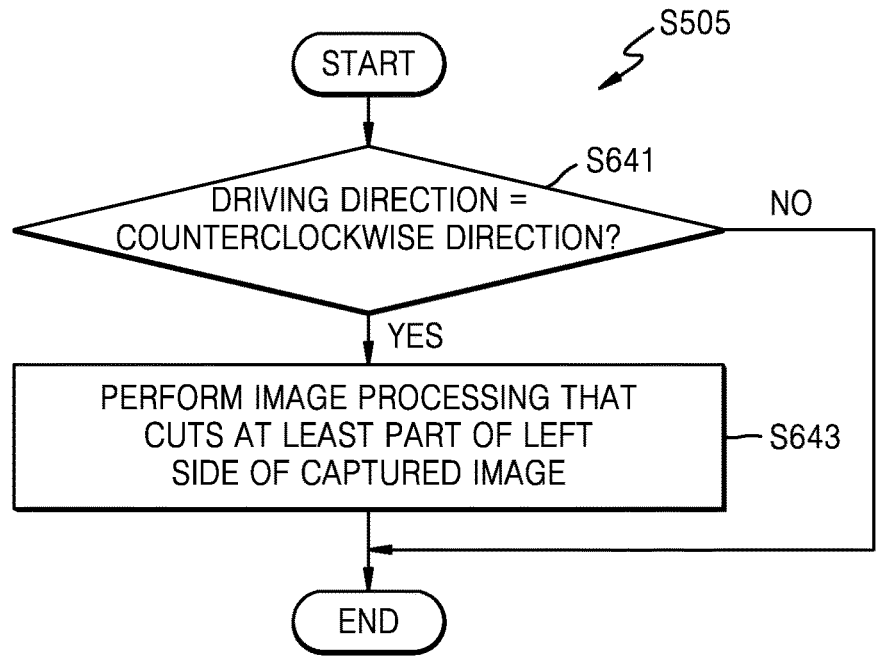

Referring to FIG. 6D, when the driving direction of the mobile module 130 is the counterclockwise direction in operation S641, the processor 120 performs image processing that cuts at least a part of a left side of the captured image in operation S643.

According to one or more embodiments, the mobile surveillance apparatus 100 may provide a user with a mobile surveillance image in which shaking is corrected so that an object is positioned in a center while driving on a driving surface with unevenness.

Figure 7:
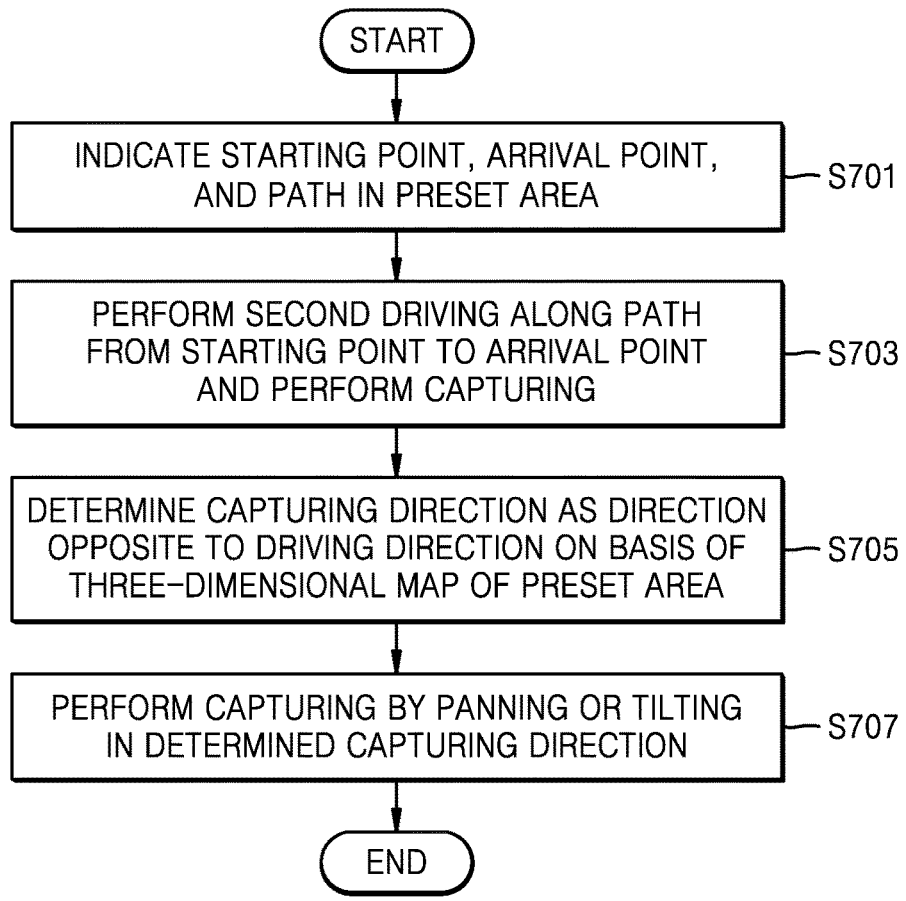
FIG. 7 is a flowchart illustrating an image acquisition method of a mobile surveillance apparatus for acquiring a captured image with the least shaking, according to an embodiment.

FIG. 7 is a flowchart illustrating an image acquisition method of a mobile surveillance apparatus for acquiring a captured image with the least shaking, according to an embodiment.

Referring to FIG. 7, in operation S701, the communication interface 110 receives information indicating a starting point, an arrival point, and a path in a preset area.

In operation S703, the mobile module 130 performs second driving along the path from the starting point to the arrival point, and the photographing module 150 performs image capturing.

In operation S705, the processor 120 sets an image capturing direction of the photographing module 150 to a direction opposite to a driving direction of the mobile module 130 based on a three-dimensional map of the preset area stored in the memory 160.

Here, the driving direction includes at least one of an upward direction, a downward direction, a clockwise direction, and a counterclockwise direction according to unevenness of the path along which the mobile module 130 performs driving.

In operation S707, the photographing module 150 performs image capturing by panning, tilting and/or zooming in the image capturing direction set by the processor 120.

In other words, the photographing module 150 may perform image capturing by panning, tilting and/or zooming in the direction opposite to the driving direction of the mobile module 130. A panning angle or a tilting angle may be set according to a degree of change in the upward direction, the downward direction, the clockwise direction and/or the counterclockwise direction according to driving, but is not limited thereto.

According to one or more embodiments, the mobile surveillance apparatus 100 may provide a user with a mobile surveillance image captured such that an object is positioned in a center while driving on a driving surface with unevenness.

According to one or more embodiments, a mobile surveillance image with less shaking may be captured, and thus, a more stable mobile surveillance image may be provided for a user.

Also, shaking of the mobile surveillance image may be corrected by a simpler operation, and thus, a stable mobile surveillance image may be more efficiently provided for the user.

In addition, an object tracking image with less shaking may be captured, and thus, a more continuous and stable object tracking image may be provided for the user.

Moreover, shaking of the object tracking image may be corrected by a simpler operation, and thus, a continuous and stable object tracking image may be more efficiently provided for the user.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the inventive concept as defined by the following claims.

What is claimed is:

1. A mobile surveillance apparatus comprising:
a communication interface configured to receive map data of a preset area; and
a processor configured to process the map data by reflecting unevenness of an uneven driving surface on which a mobile module is being shakingly driven due to the unevenness, and set a path for the mobile module based on the processed map data,
wherein the processor is further configured to generate a plurality of paths, and select the path having the least unevenness or the least unevenness change on the uneven driving surface from the plurality of paths, based on the processed map data, wherein the path having the least unevenness comprises a path with the smallest number of unevenness or a path with the smallest size of unevenness, and wherein the path having the least unevenness change comprises a path along which the smallest change in height of continuously existing unevenness occurs, or a path along which the smallest change in slope of continuously existing unevenness occurs, among the plurality paths.

2. The mobile surveillance apparatus of claim 1, wherein the uneven driving surface comprises at least one of a ground surface and an imaginary plane in the air, and wherein the unevenness comprises at least one of unevenness on the ground surface and unevenness formed by objects protruding from an imaginary plane in the air.

3. The mobile surveillance apparatus of claim 1, wherein the processor is further configured to:

predict a moving path of an object detected by a sensor based on a moving direction of the object;

generate a plurality of object tracking paths according to the moving path; and selects an object tracking path having the least unevenness or the least unevenness change on the uneven driving surface from the plurality of object tracking paths based on the processed map data.

4. The mobile surveillance apparatus of claim 1, wherein the processed map data forms a three-dimensional map.

5. The mobile surveillance apparatus of claim 3, wherein the uneven driving surface comprises at least one of a ground surface and an imaginary plane in the air, and wherein the unevenness comprises at least one of unevenness on the ground surface and unevenness formed by objects protruding from an imaginary plane in the air.

6. A mobile surveillance apparatus comprising:

a communication interface configured to receive information about a path of a mobile module, the information comprising unevenness on a driving surface of the path; and a processor configured to perform image processing on an image captured by a photographing module installed on the mobile module, according to a driving direction of the mobile module, wherein the driving direction comprises at least one of an upward direction, a downward direction, a clockwise direction, and a counterclockwise direction according to the unevenness on the driving surface of the path, and wherein the processor is configured to perform the image processing such that:

at least a part of an upper part of the captured image is cut based on the driving direction being the upward direction; and at least a part of a lower part of the captured image is cut based on the driving direction being the downward direction.

7. The mobile surveillance apparatus of claim 6, wherein the processor is further configured to perform the image processing such that:

at least a part of a right side of the captured image is cut based on the driving direction being the clockwise direction; and at least a part of a left side of the captured image is cut based on the driving direction being the counterclockwise direction.

8. The mobile surveillance apparatus of claim 7, wherein the driving surface comprises at least one of a ground surface and an imaginary plane in the air, and wherein the unevenness comprises at least one of unevenness on the ground surface and unevenness formed by objects protruding from an imaginary plane in the air.

9. The mobile surveillance apparatus of claim 6, wherein the driving surface comprises at least one of a ground surface and an imaginary plane in the air, and wherein the unevenness comprises at least one of unevenness on the ground surface and unevenness formed by objects protruding from an imaginary plane in the air.

10. A method of operating a mobile surveillance apparatus comprising a communication interface, a mobile module, a sensor, and a processor, the method comprising:

receiving, by the communication interface, map data about a preset area;

performing, by the mobile module, driving in the preset area;

sensing, by the sensor, unevenness of an uneven driving surface on which the mobile module is being shakingly driven due to the unevenness;

generating, by the processor, a plurality of paths based on the sensing;

processing, by the processor, the map data by reflecting the unevenness on the uneven driving surface, and selecting a path for the mobile module, from among the plurality paths, based on the processed map data, wherein the path has the least unevenness change on the uneven driving surface from the plurality of paths from among the plurality paths, and wherein the path having the least unevenness change comprises a path along which the smallest change in height of continuously existing unevenness occurs, or a path along which the smallest change in slope of continuously existing unevenness occurs, among the plurality paths.

11. The method of claim 10, wherein the uneven driving surface comprises at least one of a ground surface and an imaginary plane in the air, and wherein the unevenness comprises at least one of unevenness on the ground surface and unevenness formed by objects protruding from an imaginary plane in the air.

12. The method of claim 10, further comprising:

sensing, by the sensor, an object that is moving;

predicting, by the processor, a moving path of the object based on a moving direction of the object;

generating, by the processor, a plurality of object tracking paths according to the moving path; and selecting, by the processor, an object tracking path with the least unevenness or the least unevenness change on the uneven driving surface from the plurality of object tracking paths based on the processed map data.

13. A method of operating a mobile surveillance apparatus comprising a communication interface, a mobile module, a sensor, and a processor, the method comprising:

receiving, by the communication interface, information about a path of the mobile module in a preset area, the information comprising unevenness on a driving surface of the path;

performing driving, by the mobile module, along the path, and performing image capturing by a photographing module installed on the mobile module; and performing image processing, by the processor, on an image captured by the photographing module, according to a driving direction of the mobile module, wherein the driving direction comprises at least one of an upward direction, a downward direction, a clockwise direction, and a counterclockwise direction according to the unevenness on the driving surface of the path, and wherein the performing the image processing comprises performing image processing such that:

at least a part of an upper part of the captured image is cut based on the driving direction being the upward direction; and at least a part of a lower part of the captured image is cut based on the driving direction being the downward direction.

\* \* \* \* \*